United States Patent [19]
Coleman et al.

[11] 3,869,031
[45] Mar. 4, 1975

[54] STRUCTURE LEVELLING ASSEMBLY

[75] Inventors: Bestor P. Coleman, Willow Springs; Kennedy McConnell, Riverdale, both of Ill.

[73] Assignee: Interlake, Inc., Chicago, Ill.

[22] Filed: Apr. 4, 1973

[21] Appl. No.: 347,810

[52] U.S. Cl. .............................. 193/35 R, 248/300
[51] Int. Cl.... F16c 25/00, B65g 39/02, B65g 13/00
[58] Field of Search ......... 248/300, 23, 16, 70, 287, 248/298, 188.4; 193/35 R; 198/204; 52/365, 713, 678

[56] References Cited
UNITED STATES PATENTS

| | | | |
|---|---|---|---|
| 2,051,069 | 8/1936 | Bayer | 248/70 |
| 2,380,793 | 7/1945 | Rugg | 248/298 |
| 3,021,100 | 2/1962 | Verhota | 248/23 |
| 3,413,046 | 11/1968 | Kincaid | 248/16 X |
| 3,596,941 | 8/1971 | Tracy | 52/713 X |

*Primary Examiner*—J. Franklin Foss
*Attorney, Agent, or Firm*—Molinare, Allegretti, Newitt & Witcoff

[57] ABSTRACT

The inclined ramps of the conveyor are levelled by a bracket member having an inclined support surface and a pair of depending flanges which extend from the opposite edges of the support surface. The bracket member may be adjusted both in vertical elevation by way of set screws which also fasten the conveyor ramps to the brackets and transversely by way of elongate slots in the flanges.

11 Claims, 3 Drawing Figures

PATENTED MAR 4 1975
3,869,031
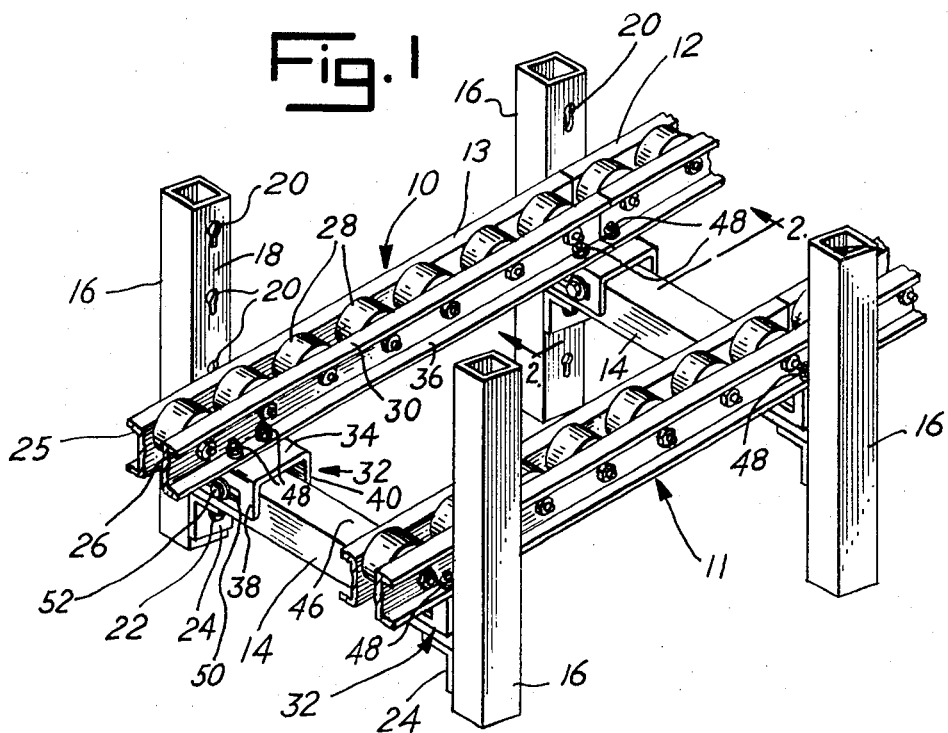
Fig. 1
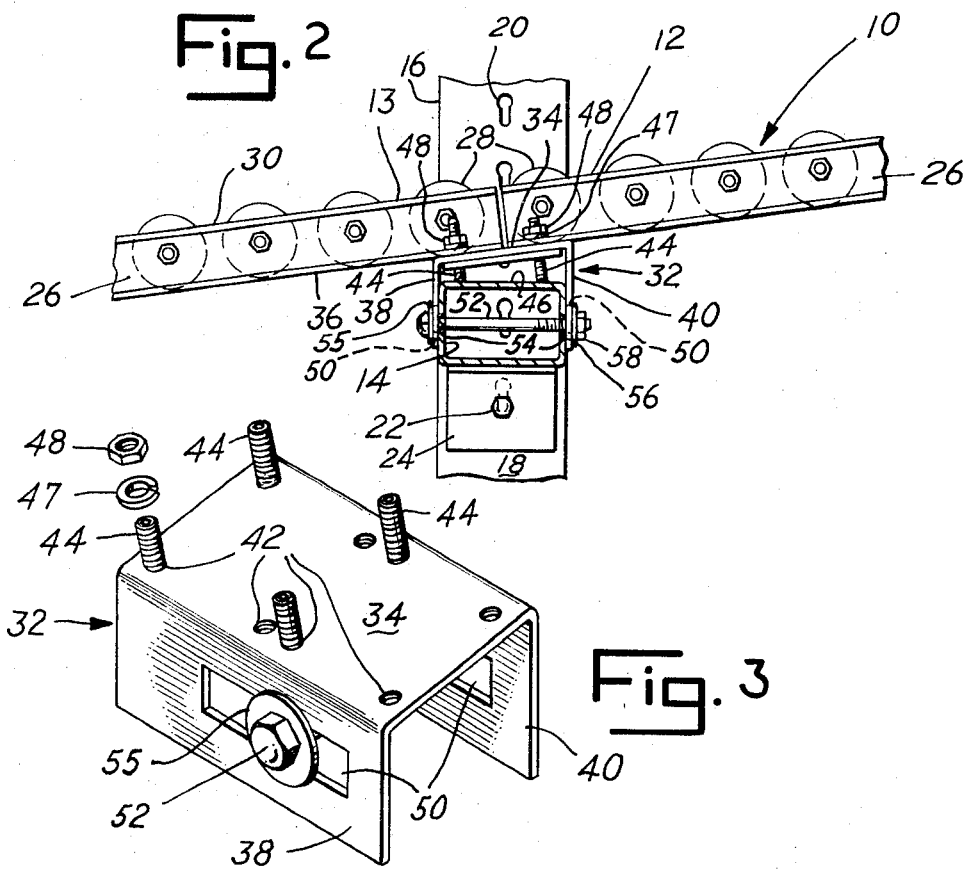
Fig. 2
Fig. 3

STRUCTURE LEVELLING ASSEMBLY

BACKGROUND AND SUMMARY OF THE INVENTION

This invention relates to a structure levelling assembly and, more particularly, to an adjustable levelling bracket therefore.

In various structures, for example inclined roller conveyors, it is necessary to insure that the conveyor ramps are levelled and positioned properly so as to effect a straight path of travel by the articles conveyed on the conveyor. In the past, the levelling of such conveyor ramps has been accomplished by the welding of transverse support frames between spaced vertical support posts at the level approximately at which the conveyor ramps are to be supported. Fine alignment of the ramps is then accomplished, as necessary, by inserting shims between the transverse support frames and the underside of the conveyor.

Such welding and shimming have several disadvantages. In the first instance elaborate welding equipment and experienced welders must be provided during the installation of the conveyor. In addition, once the stationary support frames of the conveyor have been welded in place, subsequent readjustment due to building settlement and the like is impossible without further shimming or cutting of the previously welded frames. Moreover, the shims which must be employed in such welded constructions must be provided and the shims are subject to loosening or loss during the operation of the conveyor.

The adjustable levelling bracket assembly and conveyor structure constructed in accordance with the principles of the present invention overcomes these several disadvantages. In the present invention a levelling bracket may be adjusted on site in both transverse and vertical directions and both during initial installation, as well as after extended use. In the present invention the need for welding is substantially eliminated and, thus, the provision of experienced assembly personnel and welding equipment is avoided and the ability to readjust or realign the assembly is simplified and enhanced. In the present invention shimming is generally unnecessary, the bracket of the present invention being adjustable in at least one or both of the vertical and horizontal directions. In the present invention a support surface is provided on a bracket member which may be set at the preadjusted angle of the incline of a conveyor ramp and thereby accurate incline alignment of the inclined ramps is assured. Moreover, in the assembly of the present invention a levelling bracket is employed which is inexpensive from both the standpoint of manufacture as well as installation. Finally, in the present invention threaded members may be employed both for adjustment of the elevation of a levelling bracket, as well as for securing in place the conveyor ramps or other structure which is to be levelled.

In one principal aspect of the present invention, an adjustable levelling bracket comprises a U-shaped rigid bracket member having a substantially flat support surface and a pair of flanges extending from opposite edges of the support surface. A plurality of first apertures extend through the support surface and are adapted to receive first fastener means for fastening frame means which are to be levelled to the surface and second apertures extend through the flanges and are adapted to receive second fastener means for fastening the bracket member to frame means, the second apertures being shaped to allow adjustment of the bracket member in at least one of two directions perpendicular to each other.

In another principal aspect of the present invention, a conveyor structure having conveyor means and transverse support means for supporting the conveyor means includes means for adjustably levelling the conveyor means. The levelling means comprises a U-shaped rigid bracket member having a substantially flat support surface and a pair of flanges extending from opposite edges of the surface and straddling opposite sides of one of the support frames. A plurality of first apertures extend through the support surface and first fastener means extends through the apertures for adjusting the bracket member in elevation and for fastening the conveyor means to the support surface. Second apertures are also located in the flanges and second fastener means extend through the second apertures and fasten the bracket member to the support frame.

These and other objects, features and advantages of the present invention will be more clearly understood through a consideration of the following detailed description.

BRIEF DESCRIPTION OF THE DRAWING

In the course of this description, reference will frequently be made to the attached drawing in which:

FIG. 1 is a perspective view of an inclined roller conveyor in which a preferred embodiment of alignment and levelling assembly incorporating the principles of the present invention is employed;

FIG. 2 is a cross-sectioned side elevation view of one of the inclined ramps of the conveyor taken substantially along line 2—2 of FIG. 1 and showing the positioning of a preferred embodiment of levelling bracket of the present invention; and FIG. 3 is a perspective view of the levelling bracket shown in FIG. 2.

DESCRIPTION OF THE PREFERRED EMBODIMENT

Referring to FIG. 1, a portion of an inclined roller conveyor is shown. The conveyor includes a pair of inclined roller carrying ramps 10 and 11 which are spaced from each other by a distance sufficient to support an article which is to be conveyed adjacent the edges of the article. Each of the ramps 10 and 11 preferably comprises a series of lengths 12 and 13 which are supported in end to end relationship, as shown in FIGS. 1 and 2 and at a predetermined incline by horizontally spaced transverse support frames or bars 14. The support frames 14, in turn, are mounted between pairs of upright support posts 16. Preferably, each of the support posts 16 is apertured at closely spaced intervals along one side 18 thereof by way of keyhole-shaped apertures 20 for receipt of a bolt 22 for mounting an L-shaped support bracket 24. The transverse frames 14, in turn, are attached to the L-shaped brackets 24 as by bolting or welding. The closely spaced keyhole-shaped apertures 20 are positioned such that the transverse frames 14 may be mounted by way of bolts 22 and brackets 24 at the apertures nearest the approximate elevation at which the transverse frames are to extend in supporting relationship to the underside of the inclined conveyor ramps 10 and 11.

Each of the conveyor ramps 10 and 11 preferably comprises a pair of spaced C-shaped beams 25 and 26. The concave sides of the beams are positioned so as to face away from each other as shown in FIG. 1. Between the beams 25 and 26 are mounted a plurality of longitudinally spaced idler rollers 28, the upper peripheral surface of each of the rollers being spaced slightly above the upper flanges 30 of the beams such that the tops of the rollers contact the bottom of the articles which are to be conveyed.

Due to the fixed spacing of the apertures 20 in the upright support posts 16, the positioning of the transverse frames 14 for support of the respective sections of the conveyor ramps is approximate, at best, with respect to alignment of the ramps. Thus, for fine alignment and levelling, the bracket member which is the subject of the present invention is provided and will now be described in detail.

The levelling bracket comprises a generally U-shaped bracket member 32 formed of rigid sturdy material, such as steel. The bracket member 32 includes an upward facing, substantially flat support surface 34 upon which the lower flanges 36 of the ramps 10 and 11 are adapted to rest. A pair of flanges 38 and 40 extend downward from the opposite edges of the support surface 34 and the flanges are spaced from each other by a distance sufficient to allow the bracket members to be inserted over the transverse frames 14 in straddling relationship to the opposite sides of the transverse frame as shown in FIGS. 1 and 2.

A plurality of spaced threaded apertures 42 are drilled through the thickness of the support surface 34 as shown in FIG. 3. Preferably, the width of the bracket member 32 is somewhat greater than the usual width of a given conveyor ramp, such that conveyor ramps of varying widths may be firmly supported upon the bracket support surface 34. The apertures 42 are also spaced from each other so as to accommodate conveyor ramps of varied widths without the need to provide different brackets for different width conveyor ramps.

At least four set screws 44 are also provided for each of the bracket members 32. The screws 44 are elongate and threaded preferably over their length such that the screws 44 may be inserted into the appropriate ones of the spaced apertures 42 until they contact with the upper surface 46 of their transverse frame 14. Further turning of the screws 44 will adjust the entire bracket in elevation. The ramps 10 or 11 are secured to the bracket members 32 by positioning the ramps such that the portion of the set screws extending above the support surface 34 extends upward through apertures in flanges 36 of the ramps. A lock washer 47 is positioned over each screw and a nut 48 is threaded tightly down upon the set screws to fasten the respective lengths 12 and 13 of conveyor ramps to the support surface as shown in FIG. 2.

An elongate slotted aperture 50 is formed in each of the downward extending flanges 38 and 40 as shown in FIGS. 2 and 3. A fastener bolt 52, having a diameter substantially smaller than the narrowest width of the slots 50, extends through the slotted apertures and apertures 54 in the transverse frame 14 as shown in FIG. 2 to fasten the bracket member 32 to the transverse frames. Suitable enlarged diameter washers 55 and 56 are provided which are substantially larger in diameter than the narrowest width of slots 50 to insure engagement with the outer surfaces of the flanges 38 and 40 when a nut 58 is threaded tightly on the bolt to secure the bracket member in position. The elongate slots 50, prior to full tightening of the nut 58, enable adjustment of the bracket member 32 in the transverse direction, i.e. in a direction substantially parallel to the axis of the transverse frame 14. Moreover, since the narrowest width of the elongate slot 50 is greater than the diameter of the bolt 52, adjustment in elevation within the limits of the slot width, by way of set screws 44 is also possible.

Although it is believed from the foregoing description that the operation of the assembly of the present invention will be clear to one skilled in the art, a description of the operation follows:

Initially, the upright posts 16 are positioned in place and the transverse frames 14 are mounted to the posts by way of apertures 20, bolts 22 and brackets 24. Prior to positioning the transverse frames 14, a chalkline or other reference is rigged for referral during assembly. Where the structure is an inclined roller conveyor as shown, the chalkline is extended at the incline at which the respective ramps 10 and 11 of the conveyor are to be aligned. During the positioning of the transverse frames 14, the keyhole shaped apertures 20 are selected for mounting of the given transverse frames nearest the slope of the conveyor ramps.

The levelling support bracket 32 is then positioned over the transverse frame members 14 as shown in FIGS. 1 and 2, such that the flanges 38 and 40 straddle their respective transverse frames. Bolt 52 is then loosely inserted through the elongate slots 50 and apertures 54 and the nut 58 is loosely threaded on the bolt, thereby loosely positioning the bracket member 32 in its desired position on its transverse frame.

The four set screws 44 are now threaded from above the support surface 34, one by one, into four of the apertures 42, the particular apertures selected depending upon the width of the inclined ramps 10 and 11 to be supported on the support surfaces. The set screws 44 are threaded into the apertures 42 until they contact the upper surface 46 of the transverse frame 14 as shown in FIG. 2. By selectively threading the set screws, the support surface 34 of the bracket member will be moved in elevation at and finally positioned at exactly the elevation which its inclined ramp is to be supported and the bracket member will be supported on the screws. Movement of the bracket member in elevation, it should be noted, is still possible, since the nut 58 has only been loosely threaded on the bolt 52 and since the narrowest width of slots 50 is substantially wider than the diameter of the bolt. The bracket may also be transversely adjusted as necessary in a direction parallel to the axis of the transverse beam 14 due to the elongate slots 50.

Once the bracket member 32 has been positioned such that its upward facing support surface 34 is at the desired elevational level and the entire bracket member has been transversely adjusted to the desired position directly beneath its conveyor ramp, the nut 58 is firmly tightened down to lock the bracket member in place. The conveyor ramp lengths 12 and 13 are then positioned upon the support surface 34 as shown in FIG. 2 such that the portions of the set screws 44 which extend above the support surface 34 extend through corresponding apertures in the lower flanges 36 of the respective ramp side beams 25 and 26. The lock washers 47 are then positioned over each of the extending set screws 44 and nuts 48 are threaded down tightly to secure the conveyor ramp lengths 12 and 13 in place and in accurate alignment with each other.

Once the levelling bracket members 32 are positioned in place, the slope of the support surface 34, whether horizontal or inclined, will be identical to the slope of the conveyor ramps 10 and 11 in the final installation. Accordingly, where the ramps are inclined, the support surface 34 of the bracket members will likewise be inclined and flanges 38 and 40 will extend from the edges of the support surface in non-perpendicular relationship thereto as shown in FIG. 2.

It will be understood that the embodiment of the present invention which has been described is merely illustrative of an application of the principles of the invention. Numerous modifications may be made by those skilled in the art without departing from the true spirit and scope of the invention.

What is claimed is:

1. An adjustable levelling assembly comprising,
    a U-shaped rigid bracket member having a substantially flat support surface and a pair of flanges extending from opposite edges of said support surface, said flanges being spaced from each other such that they are adapted to receive first frame means therebetween,
    a plurality of first apertures extending through said support surface, first fastener means extending through said first apertures into a location between said pair of flanges such that they may contact the first frame means, said first fastener means selectively adjusting the distance between said support surface and the first frame means in response to the length of said first fastener means extending through said first apertures, said first fastener means also being adapted to fasten second frame means which are to be levelled to said surface, and
    second apertures in said pair of flanges adapted to receive second fastener means therethrough for fastening said U-shaped rigid bracket member to said first frame means, said second apertures being shaped to allow adjustment of said bracket member in at least one of two directions perpendicular to each other as said length of said first fastener means is being adjusted.

2. In the assembly of claim 1 wherein the second apertures are shaped to allow adjustment of said bracket member in both of said directions perpendicular to each other.

3. In the assembly of claim 1 wherein said second apertures comprise elongate slots.

4. In the assembly of claim 1 wherein said first fastener means comprises threaded set screws threaded into spaced ones of said apertures and adjusting the height of said support surface in elevation, said first fastener means also including means for attaching said second frame means to the support surface when the second frame means are positioned adjacent the support surface.

5. In the assembly of claim 1 including, in combination therewith, said second fastener means, said second fastener means comprising a bolt having a diameter substantially smaller than the narrowest width of said second apertures.

6. In the assembly of claim 1 wherein said flanges depend from said flat support surface in substantially non-perpendicular relationship thereto.

7. In the assembly of claim 1 including in combination therewith, said first and second fastener means, said first fastener means comprising threaded set screws threaded into spaced ones of said first apertures and adjusting the height of said support surface in elevation, said first fastener means also including means for attaching said second frame means to the support surface when the second frame means are positioned adjacent the support surface,
    said second apertures comprising elongate slots for adjustment of said bracket member in a horizontal direction,
    said second fastener means comprising a bolt having a diameter substantially smaller than the narrowest width of said slots, and
    wherein said flanges depend from said flat support surface in substantially non-perpendicular relationship thereto.

8. In the assembly of claim 1 including, in combination therewith, conveyor means for conveying articles lengthwise along the conveyor means, transverse support fames for supporting said conveyor means, said flanges of said U-shaped rigid bracket member straddling the opposite sides of one of said transverse support frames, said first fastener means extending through said first apertures and into contact with said one of said transverse support frames for adjusting said bracket member in elevation relative to said support frame, said first fastener means also fastening said conveyor means to said flat support surface of said bracket means, and second fastener means extending through said second apertures and fastening said U-shaped bracket member to said one of said transverse support frames.

9. In the assembly of claim 8, wherein said second apertures comprise slots, whereby said bracket member may be adjusted in a direction parallel to the axis of said transverse support frame.

10. In the assembly of claim 8 wherein said flanges depend from said flat support surface in substantially non-perpendicular relationship thereto such that said support surface mounts said conveyor means at an incline.

11. In the assembly of claim 8 wherein,
    said first fastener means are threaded through spaced ones of said first apertures,
    said second apertures comprise elongate slots for adjustment of said bracket member in a direction parallel to the axis of said transverse support frame,
    said second fastener means comprise a bolt having a diameter substantially smaller than the narrowest width of said slots, and
    wherein said flanges depend from said flat support surface in substantially non-perpendicular relationship thereto.

* * * * *